United States Patent [19]

Nagaie

[11] 4,206,649
[45] Jun. 10, 1980

[54] ELECTRONIC THERMOMETER

[75] Inventor: Akihiro Nagaie, Nagaokakyo, Japan

[73] Assignee: Omron Tateisi Electronics Co., Kyoto, Japan

[21] Appl. No.: 959,481

[22] Filed: Nov. 13, 1978

[30] Foreign Application Priority Data

Nov. 11, 1977 [JP] Japan .......................... 52-151436[U]

[51] Int. Cl.² ............................................. G01K 7/24
[52] U.S. Cl. ................................. 73/362 AR; 340/802
[58] Field of Search .................. 73/362 AR; 340/790, 340/802

[56] References Cited

U.S. PATENT DOCUMENTS

| | | | |
|---|---|---|---|
| 3,611,347 | 10/1971 | Gingell | 340/802 |
| 4,009,615 | 3/1977 | Ruhl | 73/362 AR |
| 4,068,526 | 1/1978 | Goldstein | 73/362 AR |
| 4,112,764 | 9/1978 | Turner | 73/362 AR |

Primary Examiner—S. Clement Swisher
Attorney, Agent, or Firm—Stevens, Davis, Miller & Mosher

[57] ABSTRACT

An electronic thermometer capable of displaying a body temperature in a plurality of temperature units in an automatically selectable sequence, comprising means for measuring a body temperature which includes a temperature sensor, means for displaying the body temperature as measured by the measuring means, means for selecting one of the temperature units in which the body temperature is displayed by the display means, means for setting a measuring time period and control means associated with the means for selecting a temperature unit for causing the display means to display the body temperature in one of the temperature units during the measuring time period and in another of the temperature units after the measuring time period.

6 Claims, 3 Drawing Figures

ELECTRONIC THERMOMETER

BRIEF SUMMARY OF THE INVENTION

The present invention relates to an electronic thermometer capable of automatically displaying a body temperature, and more particularly to an electronic thermometer capable of switching a temperature unit, from Fahrenheit to Centigrade or from Centigrade to Fahrenheit, in which the body temperature is displayed when the body temperature measurement has been finished.

A conventional electronic thermometer detects a body temperature in response to an output signal from a temperature sensor, and displays the body temperature in a fixed temperature unit of Fahrenheit or Centigrade.

In a clinical examination, it is more convenient to know a body temperature in another temperature unit in addition to a used temperature unit. For this purpose, an electronic thermometer may have two displays, but it would be expensive.

It is, therefore, a primary object of the present invention to provide a cheap and convenient electronic thermometer having one display unit capable of displaying a body temperature in a plurality of temperature units in an automatic selectable sequence.

It is another object of the present invention to provide an electronic thermometer capable of displaying a body temperature unit during a predetermined time period and in another temperature unit after the time period.

According to one aspect of the present invention, there is provided an electronic thermometer capable of displaying a body temperature in a plurality of temperature units in an automatically selectable sequence, comprising means for measuring a body temperature which includes a temperature sensor, means for displaying the body temperature as measured by the measuring means, means for selecting one of the temperature units in which the body temperature is displayed by the display means, means for setting a measuring time period and control means associated with the means for selecting a temperature unit to allow the display means to display the body temperature in one of the temperature units during the measuring time period and in another of the temperature units after the measuring time period.

Other objects as well as the numerous advantages of the electronic thermometer according to the present invention will become apparent from the following detailed description of the invention and the accompanying drawings.

DETAILED DESCRIPTION

Figure 1:
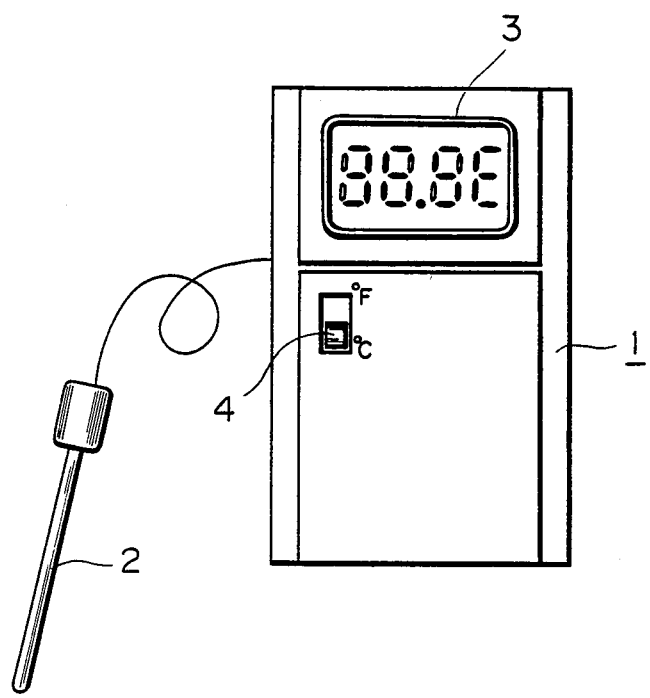
FIG. 1 is an elevational view showing an electronic thermometer embodying the principles of the present invention.

Referring, now, to FIG. 1, there is shown an electronic thermometer embodying the principles of the present invention. A temperature sensor 2 is connected to a device 1 of the electronic thermometer having a built-in arithmetic unit, such as a micro-computer, which measures a body temperature in response to an output from the sensor 2. The front pannel of the device 1 is provided with a display 3 which displays the body temperature in a selected temperature unit and has a °C./°F. unit selector 4 which selects the temperature unit, such as Centigrade "°C." or Fahrenheit "°F.", to be displayed by the display 3.

Figure 2:
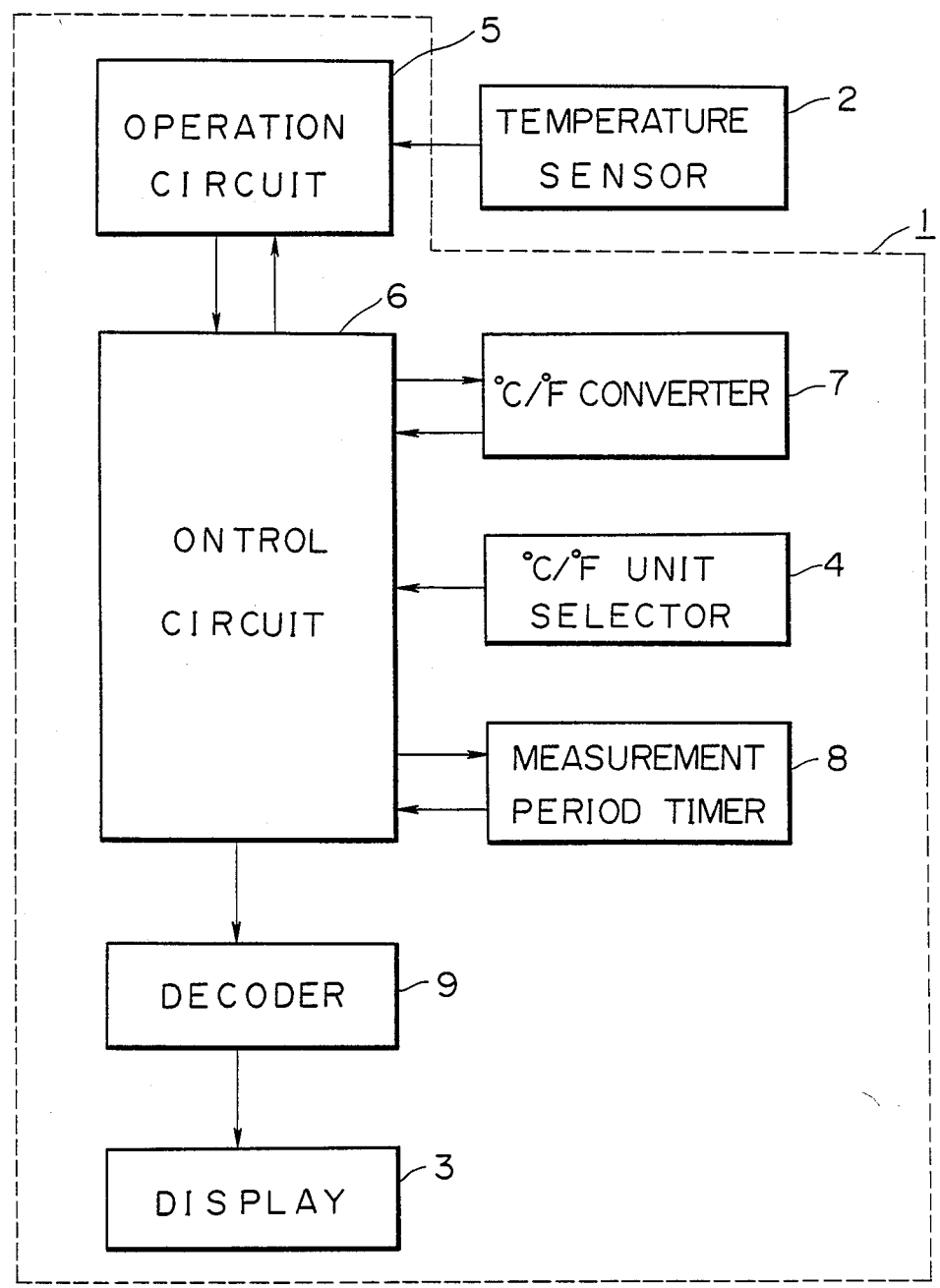
FIG. 2 is a block diagram of an electronic thermometer as one embodiment according to the present invention.

In FIg. 2, there is shown a block diagram of an electronic thermometer as one embodiment of the present invention. The temperature sensor 2 including a temperature responsive element, such as a thermistor, which is inserted into a patient body produces an output signal which corresponds to a body temperature and is applied to an operational circuit 5 in the device 1. The output signal from the sensor 2 is processed under control by a control circuit 6 in connection with a °C./°F. converter 7, a °C./°F. unit selector 4 and a measurement period timer 8 and is applied to a decoder 9 as input signal thereof. The decoded signal by the decoder 9 is applied to a display 3 to display a measured body temperature in a desired temperature unit.

Figure 3:
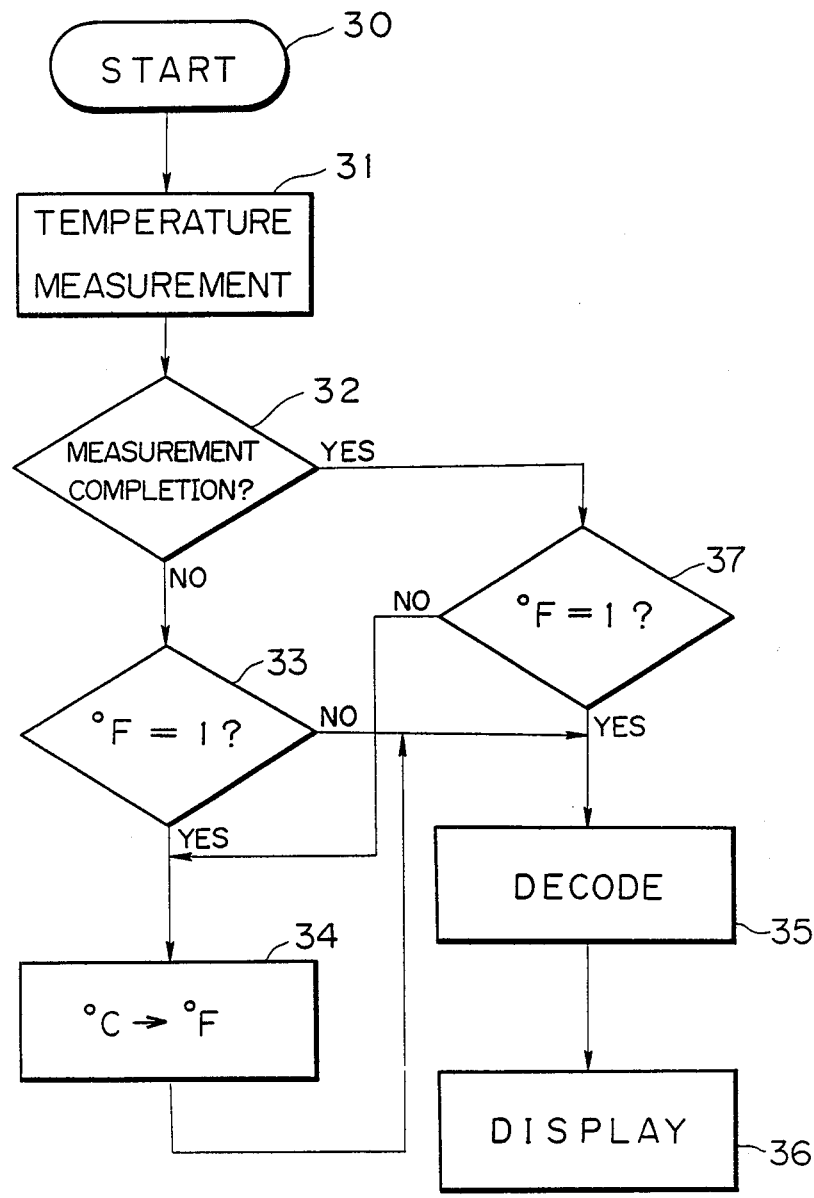
FIG. 3 is a flow diagram of the electronic thermometer associated with FIG. 2.

Referring to FIG. 3, the measurement and operation of the electronic thermometer will be illustrated hereinafter.

The operation of the electronic thermometer will start from a step 30 in FIG. 3 when the power switch thereof is closed, and the sequence moves to a step 31. In the step 31, the operation circuit 5 measures a body temperature in a temperature unit, Fahrenheit or Centigrade, in response to the output signal from the temperature sensor 2. In this embodiment, the operation circuit 5 measures the temperature in Centigrade. The sequence advances to an inquiry step 32 from the step 31 to inquire if the measuring has been completed. Such an inquiry is made by the control circuit 6 associated with the measurement period timer 8 which determines a measurement time period. A "NO" response to the inquiry step 32 advances the sequence to an inquiry step 33 to judge whether or not the °C./°F. unit selector 4 sets Fahrenheit, i.e. if °F.=1. A "YES" response to the step 33 wherein the unit selector 4 sets Fahrenheit advances the sequence to a step 34 to convert the body temperature which is measured in Centigrade into a body temperature in Fahrenheit. The convertion in the step 34 may be made by the °C./°F. converter 7. The sequence from the step 34 is introduced into a step 35 to decode the encoded temperature into a signal for the display 3 by the decoder 9. The sequence from the step 35 proceeds to a step 36. In the step 36, the body temperature which has been measured till then will be displayed by the display 3 in Fahrenheit °F. By repeating the sequence from the step 31 to the step 36 through the steps 32, 33, 34, and 35, every body temperature which has been measured will be displayed by the display 3 in sequence. When the measuring has been completed, the sequence proceeds to an inquiry step 37 from the step 32 since the step 32 generates a "YES" response. The completion of the measuring is determined by the measurement period timer 8 in this embodiment. In the step 37, it is judged whether or not the unit selector 4 sets Fahrenheit. The sequence from the step 37 proceeds to a step 35 since there should be a "YES" response to the step 37 as confirmed in the step 33 that the selector 4 sets Fahrenheit °F. Accordingly, the body temperature in Centigrade °C. which has been measured in the step 31 is decoded in the step 35 without any converting of the temperature unit to Fahrenheit to be displayed by the display 3 in the step 36. Namely, the body temperature is displayed in Fahrenheit during the measuring time period and automatically displayed in Centigrade after the measuring time period when the selector 4 sets Fahrenheit.

A sequence when the °C./°F. unit selector 4 sets Centigrade will advance as follows: In the step 31, a body temperature is measured in Centigrade by the operation circuit 5 in response to the output of the sensor 2. In the step 32, whether or not the measurement has been completed is judged. The sequence when the measurement is still in progress proceeds to the step 33 to inquire if the selector 4 sets Fahrenheit °F. Since the selector 4 sets °C., however, a "NO" response to the step 33 is generated to be applied to the step 35.

Accordingly, the body temperature which has been measured in Centigrade by the operation circuit 5 is decoded by the decoder 9 in the step 35 to be displayed in Centigrade °C. by the display 36 in the step 36 without any convertion regarding the temperature unit. The sequence when the measurement has been completed proceeds to the step 37 from the step 32. A "NO" response to the step 37 is applied to the step 34 to convert the body temperature from Centigrade to Fahrenheit by the °C./°F. converter 7 since the selector 4 sets Centigrade. The sequence from the step 34 proceeds to the step 35 and to the step 36. Accordingly, the body temperature is displayed in Fahrenheit by the display 3 in the step 36. In other words, the body temperature is displayed in Centigrade during the measurement time period and automatically displayed in Fahrenheit after the measurement time period when the selector 4 sets Centigrade.

In this embodiment, the body temperature within the measurement time period is displayed in accordance with the temperature unit which is set by the selector 4. In order to display the body temperature in the same temperature unit as this embodiment, the flow chart as shown in FIG. 3 when the body temperature is measured in Fahrenheit by the operation circuit 5 in the step 31 should be modified as the steps 33 and 37 are "°C.=1?" and the step 34 is "°F.→°C.". Though the measurement completion in the step 32 is judged in association with the measurement period timer 8 in this embodiment, various alterations may be made to the present invention. The measurement time period may be determined as a predetermined fixed time period from the start of measurement, or a predetermined fixed time period after the body temperature which is measured by the operation circuit 5 becomes constant after a rising. The display 3 of the body temperature may flicker during the measurement time period or thereafter in order to notify a person of the status if the measurement has been completed. Though not shown in the drawings, the electronic thermometer may include means for holding a peak body temperature until the measurement is completed, whereby the display 3 displays the highest temperature even after the temperature of the sensor 2 actually has dropped.

It should be understood that the electronic thermometer may be used in other temperature units, such as °K. or °T. instead of Fahrenheit and Centigrade and in other technical fields. It should be understood that the above description is merely illustrative of the present invention and that many changes and modifications may be made by those skilled in the art without departing from the spirit and scope of the invention as defined in the appended claims.

What is claimed is:

1. An electronic thermometer capable of displaying a body temperature in a plurality of temperature units in an automatically selectable sequence, comprising:
    means for measuring a body temperature which includes a temperature sensor and a means for detecting the completion of each measurement;
    means for displaying said body temperature as measured by said measuring means;
    means for selecting one of said temperature units in which said body temperature is displayed by said display means;
    means responsive to the completion of each measurement as detected by said detecting means for setting a measuring time period; and,
    control means associated with said means for selecting a temperature unit for causing said display means to display said body temperature in one of said temperature units during said measuring time period and in another of said temperature units after said measuring time period.

2. An electronic thermometer according to claim 1 wherein the temperature unit in which said body temperature is displayed within said measuring time period is the temperature unit selected by said means for selecting a temperature unit.

3. An electronic thermometer according to claim 1 wherein the temperature unit selected by said means for setting a measuring time period is Fahrenheit or Centigrade.

4. An electronic thermometer according to claim 1 wherein said measuring time period is a predetermined fixed time period.

5. An electronic thermometer according to claim 1 wherein said completion of each measurement corresponds to a time point when a predetermined subsequent time period elapses after the temperature of said temperature responsive element remains constant after a period in which it rises.

6. An electronic thermometer according to claim 1 wherein said control means causes said display means to flicker the display of the measured body temperature within said measuring time period.

* * * * *